United States Patent Office 2,897,188
Patented July 28, 1959

2,897,188
POLYAZO-DYESTUFFS

Josef Weissert, Frankfurt am Main, and Helmut Gies, Hofheim (Taunus), Germany, assignors to Farbwerke Hoechst Aktiengesellschaft vormals Meister Lucius & Bruning, Frankfurt am Main, Germany No Drawing. Application November 21, 1957
Serial No. 697,812

Claims priority, application Germany
November 28, 1956

6 Claims. (Cl. 260—144)

The present invention relates to new polyazo-dyestuffs, more particularly it relates to azo-dyestuffs corresponding to the following general formula:

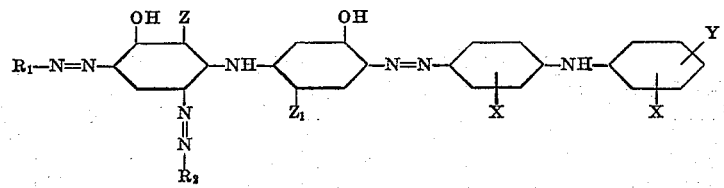

wherein one X stands for hydrogen and the other X stands for the sulfonic acid group, Y represents hydrogen, a nitro or acetylamino group, Z stands for hydrogen or the group $N=N-R_3$, $Z_1$ stands for hydrogen or the group $N=N-R_4$ and $R_1$, $R_2$, $R_3$ and $R_4$ represent aromatic radicals.

We have found that valuable brown polyazo-dyestuffs are obtained by coupling 1 mol of 3,3'-dihydroxydiphenylamine with at least 1 mol of a diazotized aminodiphenylamine sulfonic acid which may be substituted by nitro or acetylamino groups, and, if desired, with up to 4 mols of any diazo-compound.

The new dyestuffs are especially suitable for dyeing all kinds of leather. The brown tints obtained are distinguished by a good fastness to light, to washing and to perspiration. The good levelling power of the new dyestuffs is especially valuable when glove leather is dyed. In spite of a very good solubility of the dyestuffs the dyebaths are exhausted even in the presence of small quantities of an acid. These properties render the dyestuffs especially suitable for brush dyeing.

The following examples illustrate the invention, but they are not intended to limit it thereto, the parts being by weight.

Example 1

The diazo-compound obtained by diazotizing 46.4 parts of 4-amino-4'-nitrodiphenylamine-2'-sulfonic acid is adjusted to a pH-value of 10.5 with a sodium hydroxide solution of 33% strength and then combined with an alkaline solution of 20.1 parts of 3,3'-dihydroxydiphenylamine. A diazo-solution prepared from 18.6 parts of aniline is added to the dyestuff so obtained and sodium carbonate is admixed so that the pH-value does not fall below 8. The coupling occurs rapidly. The mixture is stirred for a further 4 hours and the dyestuff is separated by the addition of sodium chloride. It dyes leather beautiful yellow-brown tints of good fastness properties.

Example 2

30.9 parts of 4-amino-4'-nitrodiphenylamine-2'-sulfonic acid are diazotized in the usual manner and the diazo-compound so obtained is combined with an alkaline solution of 20.1 parts of 3,3'-dihydroxydiphenylamine. The dyestuff so obtained is then coupled with the diazotized suspension of 34.6 parts of 1-aminobenzene-4-sulfonic acid, sodium carbonate being added so that the pH-value does not fall below 8. The mixture is stirred for a further 4 hours and the dyestuff is precipitated by the addition of sodium chloride. It dyes leather beautiful brown tints and has a very good levelling power. The dyestuff corresponds to the following formula:

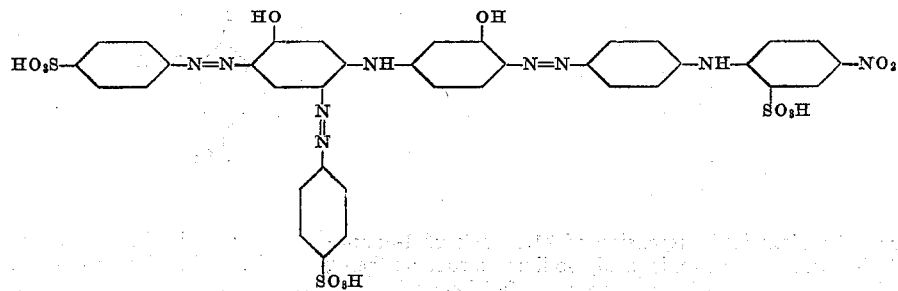

Example 3

92.7 parts of 4-amino-4'-nitrodiphenylamine-2'-sulfonic acid are diazotized in the usual manner, the diazo-compound so obtained is adjusted to a pH-value of 10.5 with a sodium hydroxide solution of 33% strength and then combined with an alkaline solution of 20.1 parts of 3,3'-dihydroxydiphenylamine. A diazo-solution prepared from 17.3 parts of 1-amino-2-chloro-4-nitrobenzene is added to the dyestuff so obtained and sodium carbonate is admixed so that the pH-value does not fall below 8. The tetrakisazo-dyestuff is rapidly formed. The mixture is stirred for a further 4 hours and the dyestuff is separated by the addition of sodium chloride. It dyes leather medium brown tints. The dyestuff corresponds to the following formula:

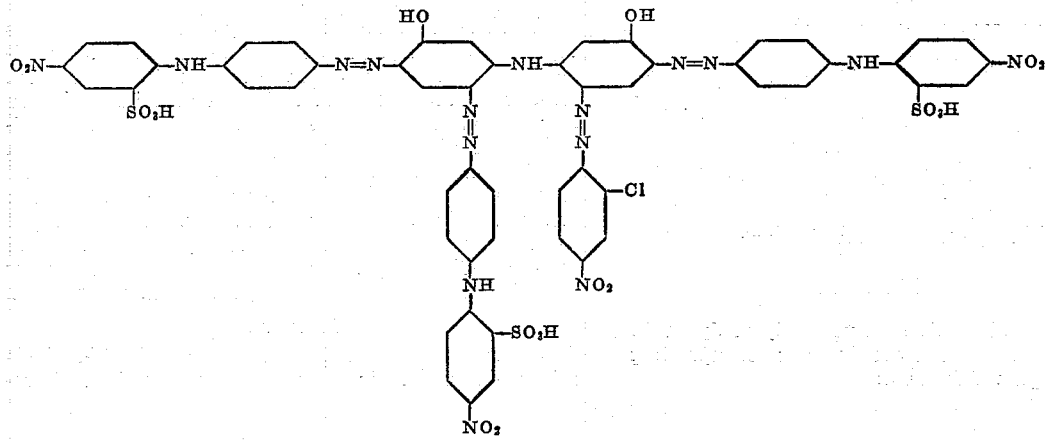

Example 4

92.7 parts of 4-amino-4'-nitrodiphenylamine-2'-sulfonic acid are diazotized in the usual manner, the diazo-compound is adjusted to a pH-value of 10.5 with a sodium hydroxide solution of 33% strength and then combined with an alkaline solution of 20.1 parts of 3,3'-dihydroxydiphenylamine. The dyestuff so obtained is then coupled with the diazotized suspension of 21.8 parts of 1-amino-4-nitrobenzene-2-sulfonic acid, sodium carbonate being added so that the pH-value does not fall below 8. The mixture is stirred for a further 4 hours and the dyestuff is precipitated by the addition of sodium chloride. It dyes leather covered brown tints and has a good levelling power.

Example 5

26.4 parts of 4-aminodiphenylamine-2-sulfonic acid are diazotized in the usual manner. The diazo-suspension obtained is caused to run into an alkaline solution of 20.1 parts of 3,3'-dihydroxydiphenylamine and a sodium hydroxide solution is added so that the pH-value does not fall below 9. When traces of diazo-compound can no longer be detected, a diazo-suspension prepared by diazotizing 61.8 parts of 4-amino-4'-nitrodiphenylamine-2'-sulfonic acid is added at the same pH-value. The trisazo-dyestuff is rapidly formed. The mixture is stirred for a further 4 hours and the dyestuff is separated by the addition of sodium chloride. After filtering and drying, a black-brown powder is obtained which is readily soluble in water. The dyestuff dyes leather deep brown tints of a good fastness to light. The levelling power and the fastness to perspiration of the dyestuff are especially good. The dyestuff can be used with special advantage for brush dyeing owing to its good solubility. It corresponds to the following formula:

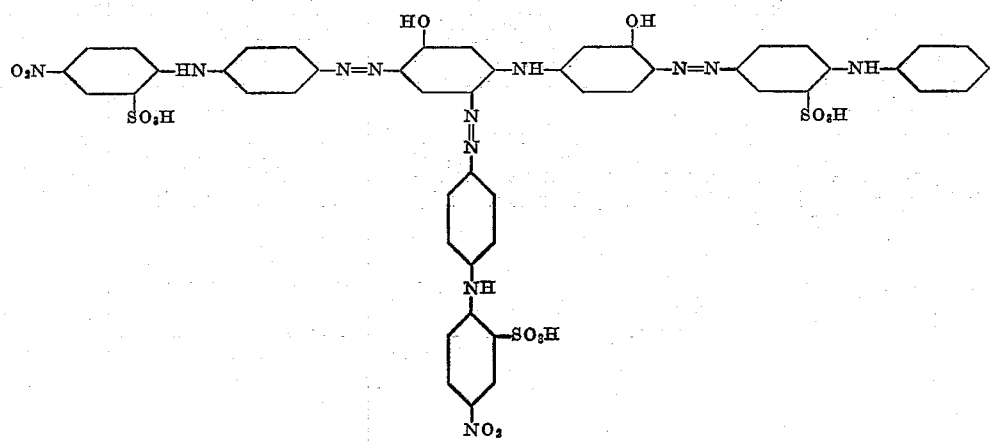

When in the above example 61.8 parts of 4-amino-4'-nitrodiphenylamine-2'-sulfonic acid are replaced by a mixture of 30.9 parts of 4-amino-4'-nitrodiphenylamine-2'-sulfonic acid and 26.4 parts of 4-aminodiphenylamine-2-sulfonic acid, a dyestuff is obtained which has similar properties but a somewhat deeper tint.

Example 6

The diazo-compound obtained by diazotizing 92.7 parts of 4-amino-4'-nitrodiphenylamine-2'-sulfonic acid is adjusted to a pH-value of 10.5 by means of a sodium hydroxide solution of 33% strength and then combined with an alkaline solution of 20.1 parts of 3,3'-dihydroxydiphenylamine. The dyestuff so obtained is coupled with the diazotized suspension of 23.9 parts of 2-amino-5-hydroxynaphthalene-7-sulfonic acid, sodium carbonate being added so that the pH-value does not fall below 8. The mixture is stirred for a further 4 hours and the dyestuff is precipitated by the addition of sodium chloride.

It dyes leather brown tints with a violet hue. The dyestuff corresponds to the following formula:

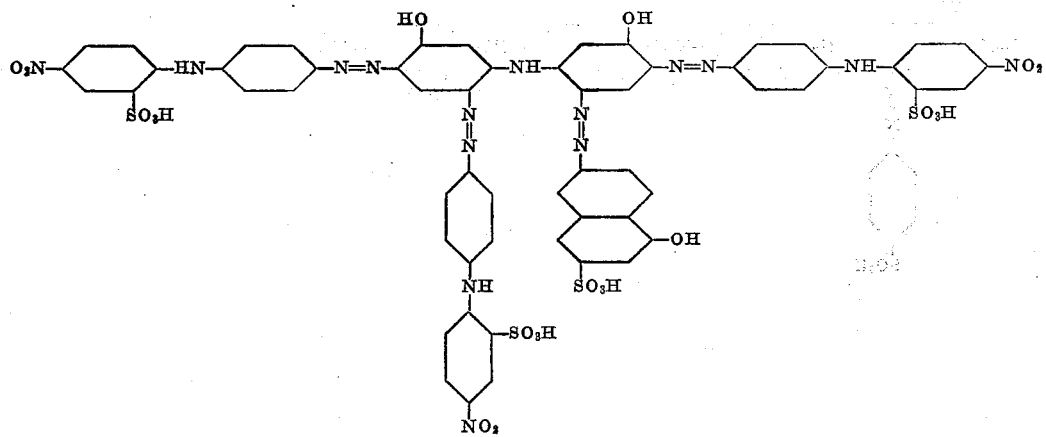

Example 7

92.7 parts of 4-amino-4'-nitrodiphenylamine-2'-sulfonic acid are diazotized in the usual manner, the diazo-compound is adjusted to a pH-value of 10.5 with a sodium hydroxide solution of 33% strength and then combined with an alkaline solution of 20.1 parts of 3,3'-dihydroxy-diphenylamine. The dyestuff so obtained is admixed with the tetrazo-solution prepared from 14 parts of 4,4'-diaminodiphenylamine-2-sulfonic acid and sodium carbonate is added so that the pH-value does not fall below 8. The mixture is stirred for a further 4 hours and the dyestuff is separated by the addition of sodium chloride. It dyes leather deep brown tints and has a good levelling power.

In the above example 0.05 mol of the tetrazo-compound is used per 0.1 mol of the trisazo-dyestuff which is transformed into the octakisazo-dyestuff.

Example 8

The diazo-compound obtained by diazotizing 135 parts of 4-amino-4'-nitrodiphenylamine-2'-sulfonic acid is adjusted to a pH-value of 10.5 with a sodium hydroxide solution of 33% strength and then combined with an alkaline solution of 20.1 parts of 3,3'-dihydroxydiphenylamine. After stirring for 4 hours the coupling solution is adjusted to a pH-value of 8 with hydrochloric acid and the dyestuff is isolated by the addition of sodium chloride. It dyes leather red-brown tints of a good fastness to perspiration and has a very good levelling power. The dyestuff corresponds to the following formula:

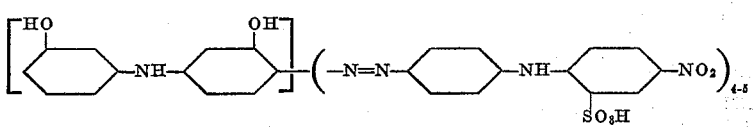

Example 9

135 parts of 4-amino-2'-nitrodiphenylamine-4'-sulfonic acid are diazotized in known manner, the diazo-compound is adjusted to a pH-value of 10.5 with a sodium hydroxide solution of 33% strength and then combined with an alkaline solution of 20.1 parts of 3,3'-dihydroxy-diphenylamine. After stirring for 4 hours the coupling solution is adjusted to a pH-value of 8 with hydrochloric acid and the dyestuff is precipitated by the addition of sodium chloride. It dyes leather red-brown tints of good covering properties.

Example 10

The diazo-compound obtained by diazotizing 144.4 parts of 4-amino-4'-acetylamino-diphenylamine-2-sulfonic acid is adjusted to a pH-value of 10.5 with a sodium hydroxide solution of 33% strength and then combined with an alkaline solution of 20.1 parts of 3,3'-dihydroxy-diphenylamine. After stirring for 4 hours the solution is adjusted to a pH-value of 8 with hydrochloric acid and the dyestuff is separated by the addition of sodium chloride. It dyes leather brown tints and has a very good levelling power.

We claim:

1. The polyazo-dyestuffs corresponding to the following general formula:

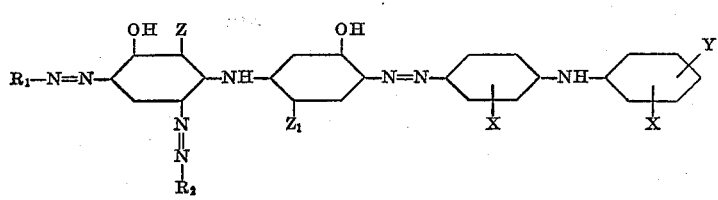

wherein one X stands for hydrogen and the other X stands for the sulfonic acid group, Y represents a member selected from the group consisting of hydrogen, nitro and acetylamino, Z stands for a member selected from the group consisting of hydrogen and the group $N=N-R_3$, $Z_1$ stands for a member selected from the group consisting of hydrogen and the group $N=N-R_4$, $R_1$ and $R_2$ represent members selected from the group consisting of radicals of the benzene and diphenylamine series, $R_3$ represents a radical of the diphenylamine series and $R_4$ represents a member selected from the group consisting of radicals of the benzene, naphthalene and diphenylamine series.

2. The polyazo-dyestuff corresponding to the following formula:
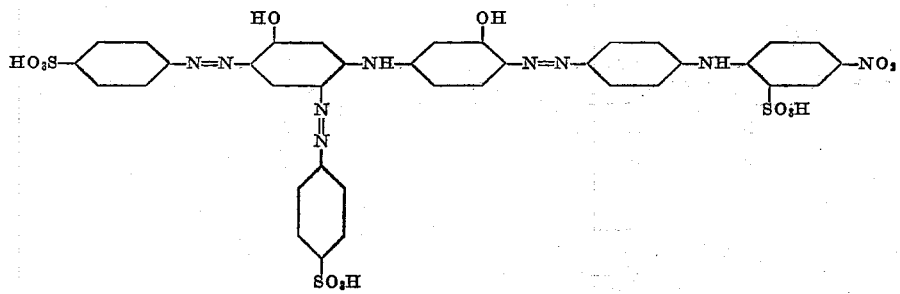
3. The polyazo-dyestuff corresponding to the following formula:
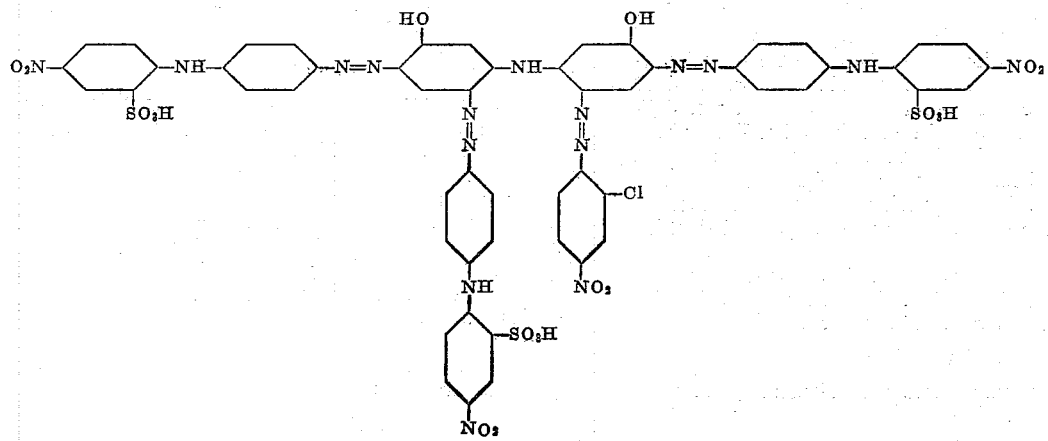
4. The polyazo-dyestuff corresponding to the following formula:
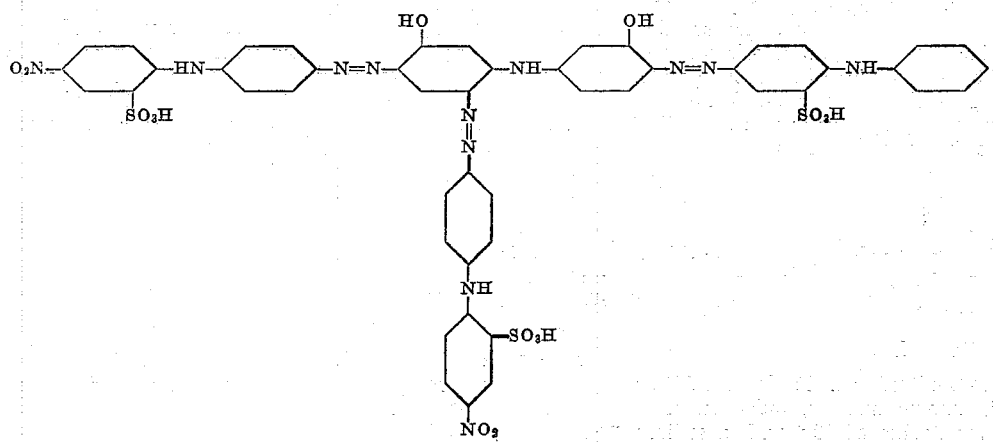

5. The polyazo-dyestuff corresponding to the following formula:
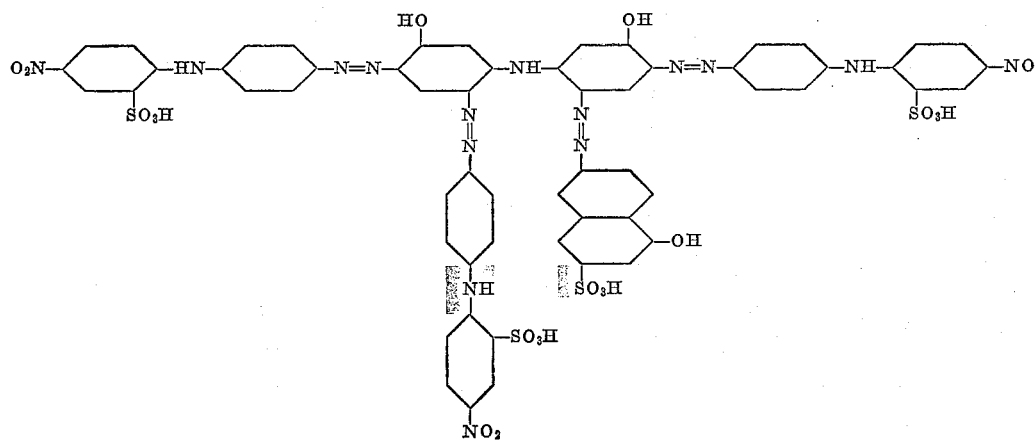
6. The polyazo-dyestuff corresponding to the following formula:
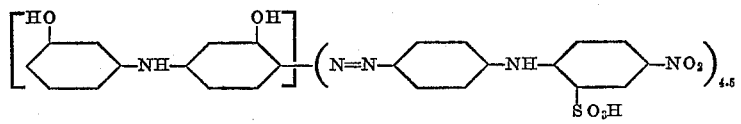
References Cited in the file of this patent
UNITED STATES PATENTS
| | | |
|---|---|---|
| 2,276,169 | Dobler, et al. | Mar. 10, 1942 |
| 2,750,375 | Siebert et al. | June 12, 1956 |
| 2,777,838 | Huss et al. | Jan. 15, 1957 |